(12) United States Patent
Kobelkov

(10) Patent No.: US 10,427,646 B2
(45) Date of Patent: Oct. 1, 2019

(54) FRAMELESS WIPER BLADE

(71) Applicant: Aleksandr D. Kobelkov, Ulyanovsk (RU)

(72) Inventor: Aleksandr D. Kobelkov, Ulyanovsk (RU)

(*) Notice: Subject to any disclaimer, the term of this patent is extended or adjusted under 35 U.S.C. 154(b) by 0 days.

(21) Appl. No.: 16/162,010

(22) Filed: Oct. 16, 2018

(65) Prior Publication Data

US 2019/0047519 A1 Feb. 14, 2019

Related U.S. Application Data

(63) Continuation of application No. PCT/RU2017/000442, filed on Jun. 22, 2017.

(30) Foreign Application Priority Data

Sep. 14, 2016 (RU) .................................. 2016136947

(51) Int. Cl.
*B60S 1/40* (2006.01)
*B60S 1/38* (2006.01)
*B60S 1/28* (2006.01)

(52) U.S. Cl.
CPC .............. *B60S 1/28* (2013.01); *B60S 1/3886* (2013.01); *B60S 1/3894* (2013.01); *B60S 1/3851* (2013.01);
(Continued)

(58) Field of Classification Search
CPC .......... B60S 1/28; B60S 1/3801; B60S 1/345; B60S 1/3894; B60S 1/3896
See application file for complete search history.

(56) References Cited

U.S. PATENT DOCUMENTS 5,257,436 A * 11/1993 Yang .................. B60S 1/38
15/250.33
5,465,454 A 11/1995 Chang
(Continued)

FOREIGN PATENT DOCUMENTS

DE 19802451 A1 7/1999
JP S56139651 U 10/1981
(Continued)

OTHER PUBLICATIONS

International Search Report from PCT/RU2017/000442, filed Jun. 22, 2017, dated Nov. 16, 2017.

*Primary Examiner* — Michael D Jennings
(74) *Attorney, Agent, or Firm* — Patentbar International, P.C.

(57) ABSTRACT

The wiper blade comprises flexible wiping elements, a wiping element holder, an element for attachment to the windshield wiper finger, and end caps. The wiping elements are installed into a single wiping element holder made from a resilient metal strip. The wiping element holder is configured with two longitudinal parallel slots. Rectangular notches are configured at the end of each slot for the flexible wiping element installation. The element for attachment to the windshield wiper arm is configured as a parallelepiped with conical outer side and a longitudinal bore. The projecting lips and fixation openings enable securing the wiping element holder with flexible wiping elements in the inner bore of the element for attachment to the wiper arm. Two openings and four recesses at the wiping element holder ends are provided for end cap fixing. Each end cap is shaped as a flat parallelepiped with rounded corners with an open front end and a closed rear end.

5 Claims, 2 Drawing Sheets

(52) U.S. Cl.
CPC ............ *B60S 1/3875* (2013.01); *B60S 1/3879* (2013.01); *B60S 1/40* (2013.01); *B60S 2001/3812* (2013.01); *B60S 2001/3837* (2013.01)

(56) References Cited

U.S. PATENT DOCUMENTS

| | | | |
|---|---|---|---|
| 5,643,790 A | 7/1997 | Morinaga et al. | |
| 7,555,806 B1 * | 7/2009 | James | B60S 1/3801 15/250.41 |
| 7,707,681 B1 * | 5/2010 | Cabak | B60S 1/38 15/250.31 |
| 8,505,153 B2 * | 8/2013 | Nelson | B60S 1/08 15/250.23 |
| 2006/0026786 A1 * | 2/2006 | Ku | B60S 1/38 15/250.32 |
| 2008/0163447 A1 * | 7/2008 | Smith | B60S 1/38 15/250.41 |
| 2008/0222833 A1 | 9/2008 | Henin et al. | |

FOREIGN PATENT DOCUMENTS

| | | |
|---|---|---|
| RU | 2346834 C1 | 2/2009 |
| SU | 1344647 A1 | 10/1987 |

\* cited by examiner

FRAMELESS WIPER BLADE

RELATED APPLICATIONS

This Application is a Continuation application of International Application PCT/RU2017/000442, filed on Jun. 22, 2017, which in turn claims priority to Russian Patent Applications No. RU2016136947, filed Sep. 14, 2016, both of which are incorporated herein by reference in their entirety.

THE FIELD OF THE INVENTION

The device relates to vehicles, namely—to vehicle front and rear window cleaning systems, in particular, to wiper blades.

BACKGROUND OF THE INVENTION

One known windshield wiper (SU, Inventor's Certificate No.1344647, published Oct. 15, 1987) comprises two holders with flexible wiping elements attached to the holder and coupled, by a driven arm, to a driving arm via gears. With such design, cleaning quality may be improved through constant uniform pressure exerted by the blades on the windshield.

One potential disadvantage of the above invention is its complex design, since the flexible wiping elements are installed in individual holders with lever arrangements and a gear transmission used to provide interaction between them.

The device of the same purpose closest to that taken as a prototype is a wiper blade assembly comprising one flexible blade installed into spoilers via two elastic members and not requiring any guide spring, clamps or caps (RF, U.S. Pat. No. 2,346,834, published Feb. 20, 2008). With this wiper blade design, the number of components may be reduced, thus facilitating the assembling operation.

Potential disadvantages of the above invention are that the spoiler has a complex design and that the flexible members are configured separately. Moreover, changing a flexible member implies fully dismantling the wiper and complicated re-assembling thereof.

SUMMARY OF THE INVENTION

An object of this invention is to improve the quality of windshield cleaning from impurities of any type and to improve the ease of operation through design upgrading.

The above object is accomplished via the availability, same as in the prior art, of: a flexible wiping element; a wiping element holder; a member for attachment to a windshield wiper arm; and a member for securing the flexible wiping element.

To accomplish the above result, i.e. to improve the quality of windshield cleaning, a frameless wiper blade structure comprises: at least two flexible wiping elements installed into a single wiping element holder which is made from a resilient metal strip and configured with two longitudinal parallel slots and a rectangular notch at the end of each slot for flexible wiping element installation. To provide for coupling to the windshield wiper arm, the wiping element holder is configured with two openings along the central axis and two openings and four recesses at its ends for end cap fixing. As such, the element for attachment to the windshield wiper arm is configured as a parallelepiped with conical outer side, a longitudinal bore and an axle for coupling with the wiper arm at one side, two parallel symmetrical projecting lips extending along both longitudinal lateral sides, and an inner bore, conforming to the shape of the wiping element holder with the flexible wiping elements installed in it, at the other side, and openings for attaching thereof.

Ease of operation is achieved through the possibility of replacing the flexible wiping elements, if the latter are fixed via two removable end caps made by molding from a flexible resilient material. Each cap is shaped as a flat parallelepiped with rounded corners, with an open front end and a closed rear end. As such, the end cap open end profile conforms to the shape of the wiping element holder with the flexible wiping elements installed in it, but is slightly larger in size, and has two vertical resilient snap-fit protrusions located at the open end and a vertical snap-fit protrusions located at the lower inner wall of the closed end.

DETAILED DESCRIPTION OF A PREFERRED EMBODIMENT

Figure 1:
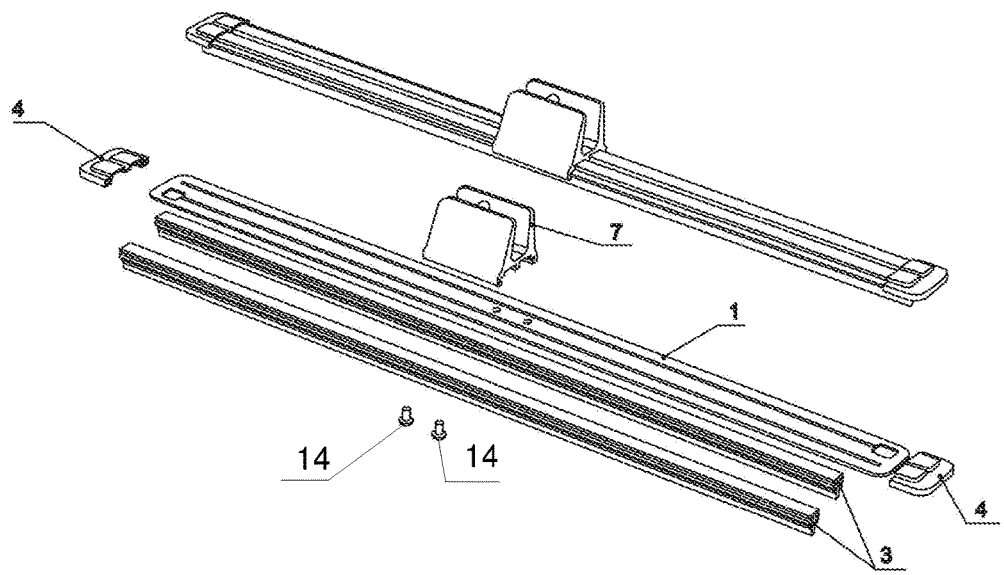
FIG. 1 is a general view of a windshield wiper.
Figure 2:
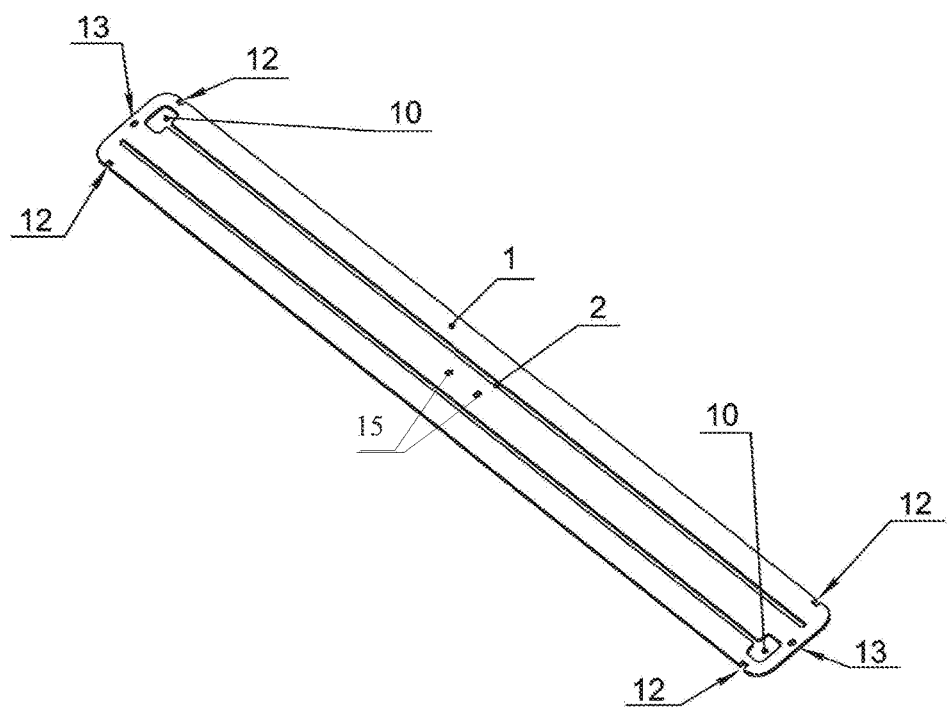
FIG. 2 shows a wiping element holder.
Figure 3:
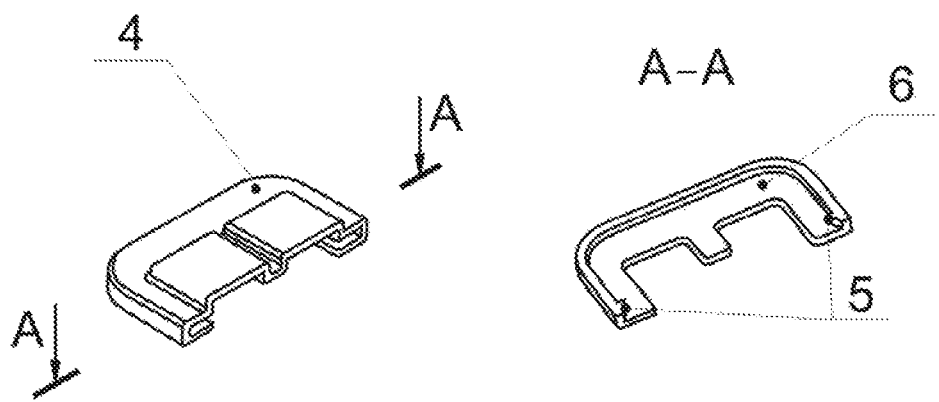
FIG. 3 shows an end tip.
Figure 4:
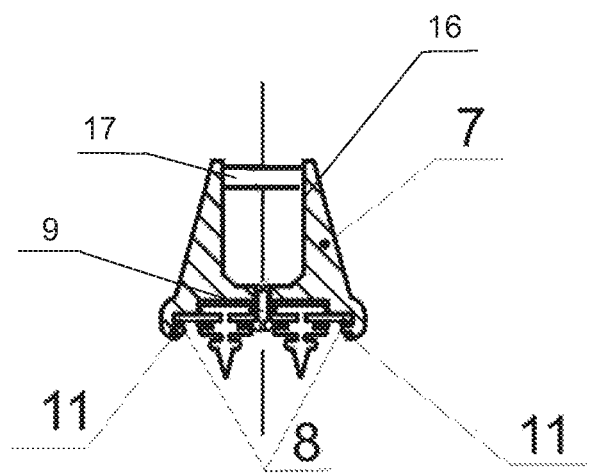
FIG. 4 shows an element for attachment to the windshield wiper finger.

A frameless wiper blade (FIG. 1) comprises: a wiping element holder 1 (FIG. 2) having longitudinal slots 2 where two flexible wiping elements 3 are installed via four rectangular notches 10, the flexible wiping elements being fixed by two end caps 4 (FIG. 3). The end cap open end has two vertical resilient snap-fit protrusions 5 and a vertical snap-fit protrusion 6 located at the lower inner wall of the end cap closed end. The wiping element holder 1 is coupled to the windshield wiper arm (not shown) via an element 7 for attachment to a wiper arm (FIG. 4). The element 7 for attachment to the wiper arm has a longitudinal bore 16 and an axle 17 for coupling with the wiper arm (not shown) at one side, and at another side an inner bore 8, conforming to the shape of the wiping element holder 1 with the flexible wiping elements installed in it, and two fixation openings 9.

The frameless wiper blade is assembled as follows.

Flexible wiping elements 3 are installed through the rectangular notches 10 at the end of each slot 2 of the wiping element holder 1. The entire structure is then installed into the inner bore 8 of the element 7 for attachment to the windshield wiper arm by means of projecting lips 11 and is screwed with the aid of screws 14 via openings 15 in the wiping element holder 1 and the openings 9.

The end caps 4 are then secured onto the wiping element holder ends. The end caps 4 are attached to the wiping element holder 1 via two vertical snap-fit protrusions 5 (FIG. 3) entering into the recesses 12 at the wiping element holder 1 and the end cap snap-fit protrusion 6 (FIG. 3) which is fixed in the wiping element holder opening 13.

INDUSTRIAL APPLICABILITY

Thus, with two flexible wiping elements, windshield cleaning quality is improved. By using a single wiping element holder and the end caps made from a flexible resilient material, and by timely replacement of the flexible wiping elements, ease of the wiper blade operation may be improved.

What is claimed is:

1. A frameless wiper blade for a vehicle comprising:
a wiping element holder comprising two longitudinal parallel slots and a rectangular notch at one end of each slot, two openings and four recesses on the ends of the wiping element holder, the two openings being disposed along a central axis of the wiping element holder;
an element for attachment to a wiper arm, and end caps for attaching at least two flexible wiping elements;
the at least two flexible wiping elements being mounted in the wiping element holder;
the wiping element holder being mounted to an internal longitudinal groove of the element for attachment to the wiper arm and affixed therein with the aid of two parallel symmetrically disposed projecting lips of the element for attachment to the wiper arm,
wherein the wiping element holder is secured by means of two openings and four recesses on the ends of the wiping element holder to which end caps are secured in a snapping manner by vertical protrusions, the vertical protrusions being disposed on an internal wall of an open end and a closed end of the end caps.

2. The frameless wiper blade of claim 1, wherein the end caps are shaped as a flat parallelepiped with rounded corners, wherein a profile of the parallelepiped conforms to a shape of the wiping element holder with the flexible wiping elements installed in it, and wherein the profile is larger than that of the shape.

3. The frameless wiper blade of claim 1, wherein the element for attachment to the wiper arm is configured as a parallelepiped with a conical outer side, a longitudinal bore and an axle for coupling with the wiper arm at one side, and at another side an inner bore, conforming to the shape of the wiping element holder with the flexible wiping elements installed in it.

4. The frameless wiper blade according to claim 1, wherein the wiping element is made of a flexible metal strip with the two longitudinal parallel slots and the rectangular notch at one end of each slot.

5. The frameless wiper blade according to claim 1, wherein the end caps are made by molding from a flexible elastic material.

* * * * *